J. A. FORSTER.
NUT LOCK.

No. 174,903. Patented March 21, 1876.

Witnesses:
Theophilus Weaver
Peter Stucker

Inventor:
James A. Forster

UNITED STATES PATENT OFFICE.

JAMES A. FORSTER, OF HARRISBURG, PENNSYLVANIA.

IMPROVEMENT IN NUT-LOCKS.

Specification forming part of Letters Patent No. 174,903, dated March 21, 1876; application filed February 3, 1876.

*To all whom it may concern:*

Be it known that I, JAMES A. FORSTER, of the city of Harrisburg, county of Dauphin, and State of Pennsylvania, have invented an Improvement in Nut-Locks, of which the following is a full, clear, and exact description, reference being had to the accompanying drawings, making a part of this specification, in which—

Figure 1:
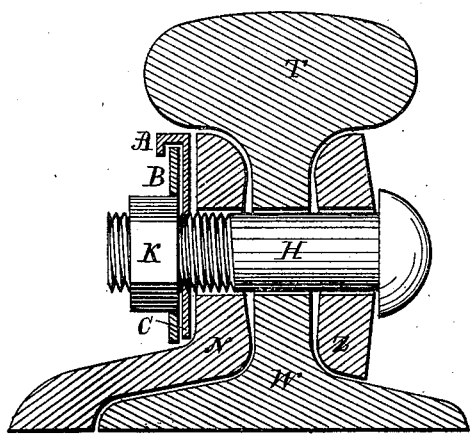
Figure 2:
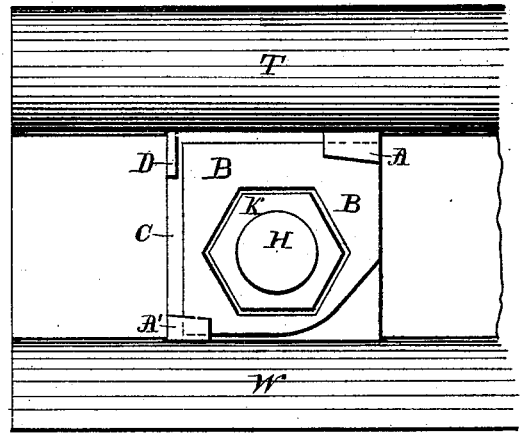
Figure 3:
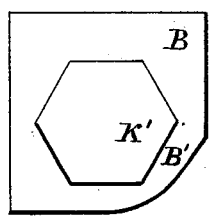
Figure 4:
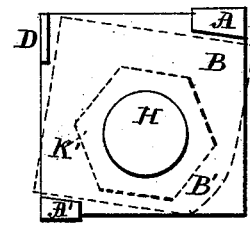

Figure 1 is a transverse sectional view of my device, applied to the usual railway-rail and its joint-bars. Fig. 2 represents a front view of the same. Fig. 3 represents my locking-plate detached. Fig. 4 represents my washer-plate and the locking-plate indicated thereon.

The object of my invention is to provide a simple device that can be used repeatedly, or many times, for locking nuts of the ordinary make on the ordinary bolts employed on fishbars to connect railway-rails. It consists of a hooked washer-plate applied under the nut and made to abut against the head of the rail, and against its foot, or against the fishbar foot; and of a locking-plate, having eye to fit the nut loosely, and form and size to fit said washer and engage the hooks thereon.

In the description following, T W represent the railway-rail; H is the usual bolt, and K is the usual nut; Z is the usual fish-bar, and N is the same with the improved lower extremity, or wing, by which it is made to cover the foot of the rail, to secure a better joint for the rails when spiked on the usual ties. A A' D represent my improved washer-plate, made with angular hooks A A' on its opposite edges and having a standard or stop, D, thereon. The hooks A A' are suitably designed to fit the thickness of the locking-plate B, so that when it is inserted on the washer it may be held on the face thereof by the hooks. The locking-plate B is made as shown in Fig. 3, having the eye K' therein conformed to the nut K, and having its one corner cut off roundly at B' so that when applied to the rail or fish-bar it may be allowed to make a partial turn freely, to secure its insertion in the detents or hooks on the washer-plate A A' D, which is made to be stationary by having its top and bottom abut against the parts shown and described.

The operations of my device are simply these: Apply the washer A A' D to place, as shown in Fig. 1, and drive the nut K tightly thereon. Next, apply the locking-plate B, as shown in Fig. 4. Then release the nut K by a few degrees of one turn. The locking-plate will thus be carried by the nut into the position as shown in Fig. 2, that is, the edges of the locking-plate will be inserted in and stopped by the hooked parts A A' on the washer-plate. Any further releasement of the nut is thus checked, and the locking-plate cannot be removed until the nut is again driven forward, which will not occur by accident or gravity. The lock is, therefore, reliable. It can, also, be reapplied, as no part need be broken to release it. It can be modified to apply to wood surfaces. The washer may then have one or more spurs formed on its under side, to bite into the wood and keep it from turning.

Having thus fully and clearly described my invention, what I regard as new and useful, and what I desire to secure by Letters Patent of the United States, is embraced in the following claims.

I claim—

1. The nut-lock composed of the washer-plate with upturned and hooked parts A A' D arranged on its margin, and the discous locking-plate B, with rounded side B', said plates being applied to each other removably, and adapted without change thereof to the ordinary bolt and nut, and operating as and for the purpose set forth.

2. The combination of the plates A A' D and B B', constructed as set forth, and the flanges of the common rail T or fish-bar N, bolt H, and nut K, all operating as set forth.

In testimony that I claim the foregoing as my invention I have hereunto set my hand this 1st day of February, A. D. 1876.

JAMES A. FORSTER.

Attest:
THEOPHILUS WEAVER,
PETER STUCKER.